(12) United States Patent
Curello et al.

(10) Patent No.: US 7,832,433 B2
(45) Date of Patent: Nov. 16, 2010

(54) HYDROGEN GENERATING FUEL CELL CARTRIDGES

(75) Inventors: Andrew J. Curello, Hamden, CT (US); Floyd Fairbanks, Naugatuck, CT (US)

(73) Assignee: Societe Bic (FR)

( * ) Notice: Subject to any disclaimer, the term of this patent is extended or adjusted under 35 U.S.C. 154(b) by 1135 days.

(21) Appl. No.: 11/463,161

(22) Filed: Aug. 8, 2006

(65) Prior Publication Data
US 2008/0035669 A1 Feb. 14, 2008

(51) Int. Cl.
*B65B 31/04* (2006.01)

(52) U.S. Cl. .......................... 141/39; 141/19; 141/197; 222/5; 222/56; 96/150

(58) Field of Classification Search .................. 141/19, 141/39, 47, 98, 100, 103, 192, 197, 250, 141/284; 222/3, 5, 55, 56; 206/6; 99/108, 99/113, 150
See application file for complete search history.

(56) References Cited

U.S. PATENT DOCUMENTS

| | | | |
|---|---|---|---|
| 3,184,899 A | 5/1965 | Frazier | |
| 3,726,649 A * | 4/1973 | Pelham | 22/113 |
| 4,302,217 A | 11/1981 | Teitel | |
| 4,303,432 A | 12/1981 | Torobin | |
| 4,328,768 A | 5/1982 | Tracy et al. | |
| 6,015,106 A * | 1/2000 | Turgeon et al. | 241/69 |
| 7,128,997 B2 * | 10/2006 | Harding et al. | 429/413 |
| 7,169,489 B2 * | 1/2007 | Redmond | 429/515 |
| 2002/0106501 A1 * | 8/2002 | Debe | 428/305.5 |
| 2004/0101740 A1 | 5/2004 | Sanders | |

OTHER PUBLICATIONS

Fuel Cell Works, "AU Researchers looking at Hydrogen in Tiny Glass Beads as Fuel Source for cars," www.fuelcellsworks.com/Suppage1764.html. Published: Dec. 27, 2004. Source: Alfred University.

* cited by examiner

*Primary Examiner*—Gregory L Huson
*Assistant Examiner*—Jason K Niesz
(74) *Attorney, Agent, or Firm*—The H.T. Than Law Group (57) ABSTRACT

A gas-generating apparatus includes a fuel storage chamber having a fuel gas stored within a plurality of microspheres. A releasing mechanism releases the gas from the microspheres, such as by fracturing the spheres or diffusing the gas through the spheres. A ratcheting mechanism controls the release of the gas, such as hydrogen, from the microspheres. The ratcheting mechanism is controlled by either the pressure within the fuel storage chamber or an electronic controller. Additionally, the gas-generating apparatus of the present invention includes a fuel introducing system that has a fuel transporting system that is pressure regulated.

16 Claims, 7 Drawing Sheets

HYDROGEN GENERATING FUEL CELL CARTRIDGES

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

Half-reaction at the cathode:

The overall fuel cell reaction:

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

Half-reaction at the cathode:

In a chemical metal hydride fuel cell, sodium borohydride is reformed and reacts as follows:

Half-reaction at the anode:

Half-reaction at the cathode:

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference in its entirety.

One of the most important features for fuel cell application is fuel storage. Another important feature is to regulate the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One disadvantage of the known hydrogen gas generators is that once the reaction starts the gas generator cartridge cannot accurately control the reaction. Thus, the reaction may continue until the supply of the reactants run out or the source of the reactant is manually shut down.

Accordingly, there is a desire to obtain a hydrogen gas generator apparatus that is capable of long-term storage of hydrogen gas and self-regulating the flow of the hydrogen gas.

SUMMARY OF THE INVENTION

One aspect of the present invention is directed toward a gas-introducing apparatus that includes a chamber, an indexing mechanism operatively connected to at least one gas-containing storage unit, and a gas-releasing mechanism capable of releasing the gas from the storage unit to release a predetermined amount of the gas into the chamber.

BRIEF DESCRIPTION OF THE DRAWINGS

It is to be understood that both the foregoing general description and the following detailed description are exemplary and explanatory only and are intended to provide a further explanation of the present invention, as claimed. In the accompanying drawings, which form a part of the specification and are to be read in conjunction therewith and in which like reference numerals are used to indicate like parts in the various views:

DETAILED DESCRIPTION OF THE PREFERRED EMBODIMENTS

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005, which are incorporated herein by reference in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497, and 6,758,871, which are incorporated herein by reference in their entireties. Furthermore, fuels include those compositions that are partially dissolved in a solvent and partially suspended in a solvent, as described in U.S. Pat. No. 6,773,470 and those compositions that include both liquid fuel and solid fuels, described in United States published patent application no. 2002/0076602. These references are also incorporated by reference in their entireties.

Fuels can also include a metal hydride such as sodium borohydride ($NaBH_4$) and water, discussed above. Fuels can further include hydrocarbon fuels, which include, but are not limited to, butane, kerosene, alcohol, and natural gas, as set forth in United States published patent application no. 2003/0096150, entitled "Liquid Hereto-Interface Fuel Cell Device," published on May 22, 2003, which is incorporated herein by reference in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals and mixtures thereof. Also, as used herein, "fuel" also includes hydrogen gas.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubes connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engine built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

The present invention provides storage, delivery, and controlled release of fuel, such as hydrogen, to a fuel cell. The storage portion of the present invention preferably includes hollow microbubbles and/or microspheres filled with high-pressure hydrogen gas.

Relevant characteristics of the microspheres include their shapes, sizes or volumes and size distributions, wall thickness, density, aspect ratio (ratio of mean diameter to wall thickness for spheres), material composition, permeability of those materials to gases as a function of temperature for filling purposes, and material strength.

The microspheres may have arbitrary shapes, but preferably are spherical so as to maximize hoop stress and to withstand maximum internal pressures. Other shapes include any geometric three-dimensional polygons with arbitrary numbers of sides, ranging from cubes to buckminsterfullerenes, spheres, cylinders, hemispheres or hemicylinders, pyramids, and the like.

The microspheres may have a distribution of sizes (i.e., volumes or average diameters). The distribution can be described by a particle size characterization function, (e.g., Gaussian, Lorentzian, or log-normal) or it can be unimodal (meaning only one size microbubbles), bimodal, trimodal, or multimodal. When a bimodal, trimodal, or multimodal size distribution is used, the packing efficiency can be increased over the use of unimodal.

Preferably, the microspheres have average diameters (maximum dimension) in the range of from about 1 to about 1000 µm, preferably, from about 5 to about 200 µm. Preferably, the microspheres can have average volumes in the range of from about 50 cubic micrometers to about 5 million cubic micrometers.

Microsphere shells useful in the invention can be ceramic, metal (such as Ti and Pd) or glass, with glass being the preferred material. Shells that are brittle and break when mechanical pressure or other means is applied are preferred. Preferably, shells have negligible permeability to the gas contained therein at the use temperature and high permeability at the temperature of filling. Average thicknesses of the shells may be in the range of from about 0.01 µm to about 20 µm, more preferably from about 0.1 µm to about 2.0 µm. The hollow cavity of the shells can contain any gas, preferably hydrogen, and preferably the gas is at a pressure in the range of from about 0.69 MPa to about 138 MPa (from about 100 to about 20,000 psi), more preferably from about 6.9 MPa to about 69 MPa (1000 to 10,000 psi). Gas-filled microspheres may be made according to methods of preparation disclosed in any of U.S. Pat. Nos. 2,797,201, 2,892,508, 3,030,215, 3,184,899, and 3,365,315, all of which are incorporated herein by reference in their entirety.

In general, in preferred embodiments, using microspheres with higher glass tensile strength (e.g., about 483,000 kPa) or lower aspect ratio (diameter to wall thickness) will enable higher pressurization, because gas content increases with smaller aspect ratios and because thinner shells hold much less pressure. Use of shells with higher gas permeabilities at lower filling temperatures can facilitate increasing the gas pressure at use temperatures and the gas density per unit volume of filled microspheres. It is readily understood from the Ideal Gas Law that the drop of internal pressure upon cooling after filling to the use temperature will be minimized when the filling temperature is as low as possible, consistent with adequate gas permeability of the shells. Similarly, optimizing the packing density of the microspheres on a support by a more effective deposition method or by controlling the microsphere diameters, or both, may also increase the gas loading.

A thin layer of microspheres may comprise, in one embodiment, 1 to 10 or more monolayers of unimodal-sized microspheres or, in another embodiment, a mixed layer of multimodal sized microspheres having a thickness equal to about 1 to 10 times the average diameter of the microspheres.

Additionally, the gas-introducing apparatus of the present invention can include a device or system that is capable of controlling the release of the hydrogen from the microspheres. The operating conditions inside the gas-introducing apparatus, e.g., the pressure, are capable of controlling the release of the hydrogen from the microspheres. For example, the hydrogen gas from the microspheres can be released when the pressure inside the chamber is less than a predetermined value. The release of the hydrogen gas is preferably self-regulated. Thus, when the chamber reaches a predetermined pressure, the release of the hydrogen gas can be halted. Similarly, when the pressure of the chamber is reduced below the predetermined pressure, the hydrogen gas can again be released into the chamber. The hydrogen gas can be introduced into the chamber by fracturing the microspheres containing the hydrogen gas. Preferably, the chamber of the present invention includes an indexing mechanism, a ratcheting mechanism, a plurality of hydrogen-containing microspheres, and optional supply and take-up reels or other mechanisms for positioning the hydrogen-containing microspheres.

Figure 1:
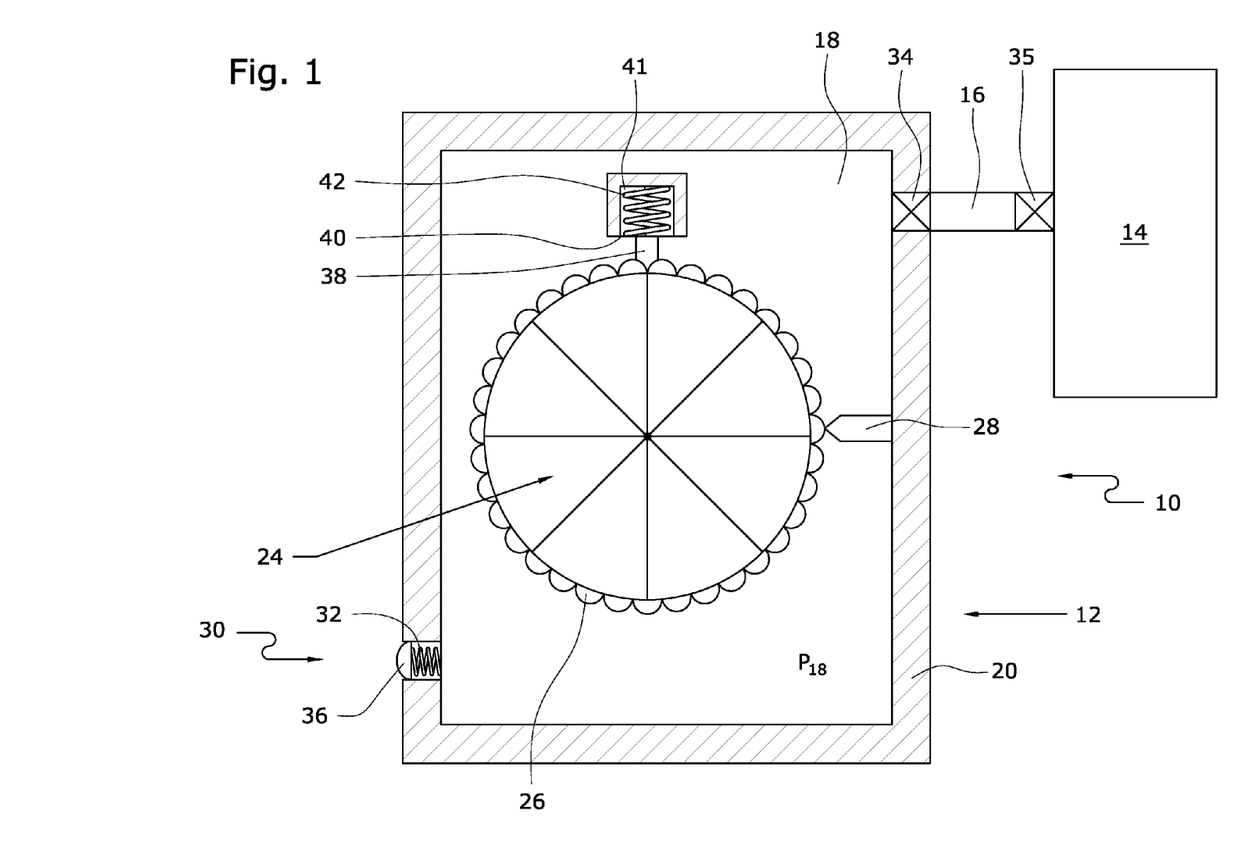
FIG. 1 is a front cross-sectional schematic view of an embodiment of a fuel supply according to the present invention.

Referring to FIG. 1, a fuel supply system 10 is shown. System 10 includes a gas-generating apparatus 12 connected to a fuel cell 14. A fuel conduit 16 transfers fuel, such as hydrogen gas, to fuel cell 14. Fuel conduit 16 may be any type of fuel conduit known in the art, such as a plastic or non-reactive metal pipe or tube.

Gas-generating apparatus 12 generally includes a fuel storage chamber 18 enclosed within sidewalls 20 made of a material that is preferably rigid and non-reactive with the fuel, such as plastic or stainless steel. Positioned within fuel storage chamber 18 is an indexing wheel 24. Indexing wheel 24 is any appropriate indexing wheel known in the art, made, for example, from non-reactive metals, such as stainless steel, plastics, or similar rigid materials inert to the fuel gas. Indexing wheel 24 is preferably ratcheted, i.e., indexing wheel 24 is able to turn only in one direction. Indexing wheel 24 includes any appropriate ratcheting mechanism known in the art, such as unidirectional stops, sloped teeth and a pawl, or similar mechanisms (not shown).

An outer surface of indexing wheel 24 includes a plurality of microspheres 26, which may be any type of microsphere or microbubble, as discussed above. Preferably, microspheres 26 are made of a material such as silica, and are preferably generally spherical, although any other configuration is also suitable, such as lobed, cylindrical, ovoid, etc. Microspheres 26 contain a fuel gas, preferably hydrogen, sealed therewithin. Preferably, hydrogen-filled microspheres 26 are adhered to the surface of indexing wheel 24 and/or placed in pouches surrounding indexing wheel 24. However, other methods known to one skilled in the art can also be used to place the hydrogen-filled microspheres 26 on the surface of indexing wheel 24. The precise configuration of microspheres 26 on the outer surface of indexing wheel 24 depends on many factors, including ease of manufacturing and the ability to pack microspheres 26 sufficiently close together to achieve a desired energy density.

Figure 1A:
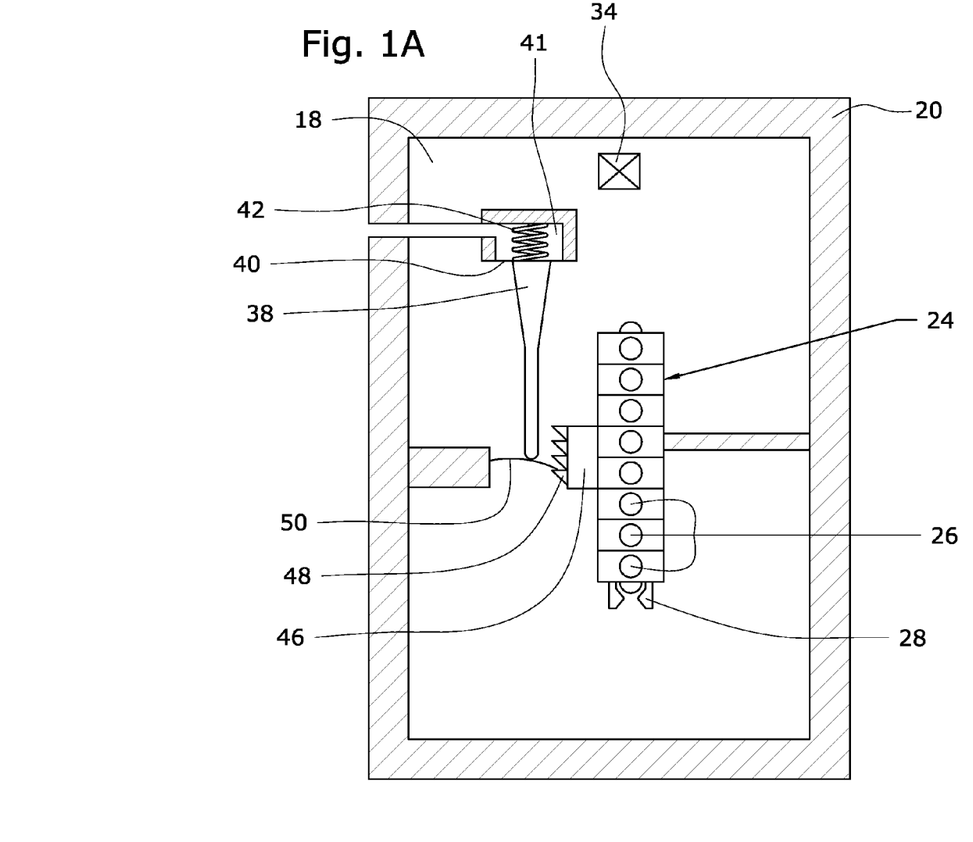
FIG. 1A is a side cross-sectional schematic view of another embodiment of a fuel supply according to the present invention illustrating the ratcheting mechanism and showing an alternate opening mechanism.

As indexing wheel 24 turns, microspheres 26 are positioned so as to come into contact with or be in the line of sight of an opening mechanism 28 that is capable of releasing the fuel gas in microspheres 26 into chamber 18, such as by fracturing or breaking microspheres 26 or by diffusing the fuel gas from microspheres 26. Opening mechanism 28 is any structure capable of placing enough pressure on hydrogen-containing microspheres 26 to fracture and/or break microspheres 26. For example, opening mechanism 28 may be a hammer, as shown in FIG. 1, or a pinching mechanism, as shown in FIG. 1A. Preferably, opening mechanism 28 is configured such that its end includes a pinching mechanism that comes in contact with each of hydrogen-filled microspheres 26 to fracture microspheres 26 and release the hydrogen. Alternatively, opening mechanism 28 may be any mechanism capable of allowing the gas within microspheres 26 to escape therefrom, such as by exposure to a light beam and/or a heat source. When a light source is used to fracture glass microspheres 26, the light source has a wavelength close to the resonant frequency of the microspheres. When a heat source is used to allow the hydrogen to escape from glass microspheres 26, preferably, glass microspheres 26 containing hydrogen gas are heated to a temperature sufficient to increase the internal pressure of the microspheres to overcome the structural integrity of the wall of the microspheres.

The size of indexing wheel 24 generally determines the amount of fuel that can be made available in chamber 18, as opening mechanism 28 fractures only those hydrogen-filled microspheres 26 that move past opening mechanism 28 with each indexed movement of indexing wheel 24. The size of indexing wheel 24, i.e., the diameter of indexing wheel 24, is selected so that a preferred distance along the circumference of indexing wheel 24 is traversed with each indexed movement of indexing wheel 24. As such, the larger the circumference of indexing wheel 24, the larger the number of gas-filled microspheres 26 that may be placed on the outer surface of indexing wheel 24. Preferably, the size of indexing wheel 24 is small enough to fit entirely within chamber 18. Also, preferably, only one microsphere 26 moves past opening mechanism 28 with each indexed movement of wheel 24.

A valve 34 is provided at or near the interface of fuel conduit 16. Valve 34 helps to control the flow of gas into and out of gas-introducing apparatus 12 and may be used to seal fuel conduit 16. For example, valve 34 may be a unidirectional valve that allows gas to flow from gas-introducing apparatus 12 into fuel conduit 16 but not in the reverse direction. Valve 34 can be opened by the fuel cell when hydrogen is needed and may be closed when hydrogen is not required. Preferably, valve 34 operates by the pressure difference between $P_{18}$, the pressure in chamber 18, and $P_{16}$, the pressure in conduit 16. Valve 34 normally opens when this pressure difference reaches a triggering pressure, $P_T$. Conduit 16 may also be sealed with another valve, e.g., shut-off valve 35, preferably located downstream of valve 34, that can be opened by the fuel cell or the user when hydrogen is needed.

Preferably, each of the plurality of microspheres 26 includes enough fuel such that when the gas is released from microsphere 26 into chamber 18, pressure $P_{18}$ is increased appreciably. As more and more fuel gas is introduced, $P_{18}$ eventually triggers the opening of valve 34 when $P_T$ is reached, so that the pressure in chamber 18 is relieved by forcing the introduced gas through valve 34 and into fuel cell 14 via fuel conduit 16.

The motion of indexing wheel 24 is preferably automatically controlled by $P_{18}$, the internal pressure of fuel storage chamber 18, triggering a ratcheting system. The ratcheting system may be any known ratcheting system in the art. One example of an appropriate ratcheting system is shown in FIGS. 1 and 1A, where a spring-loaded diaphragm 40, such as rubber or urethane membrane, is sealingly disposed within a chamber 41 and attached therein to a spring 42. Diaphragm 40 is a pressure sensitive diaphragm and is exposed to $P_{18}$, the gas pressure within fuel storage chamber 18. Spring 42 provides a biasing force K to bias diaphragm 40 toward wheel 24. $P_{18}$ and K oppose one another so that when $P_{18}$ is greater than K, diaphragm 40 is pushed away from wheel 24. Similarly, when $P_{18}$ is less than K, diaphragm 40 is pushed toward wheel 24.

Diaphragm 40 is attached to a rod 38, so that the movement of diaphragm 40 due to the opposing forces of $P_{18}$ and K move rod 38. The other end of rod 38 is attached to a pawl such as a spring arm 50. Spring arm 50 is preferably a thin flexible member made from a non-reactive metal or plastic with one end thereof fixedly attached to sidewall 20 and the other end thereof engaged with an indexing mechanism 46.

Figure 1B:
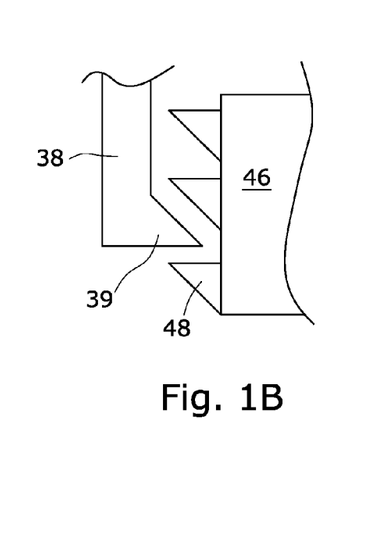
FIG. 1B is an enlarged schematic view of an alternate engagement portion for the ratcheting mechanism of FIG. 1A.

Indexing mechanism 46 is fixedly attached to indexing wheel 24 and preferably contains a plurality of angled teeth 48. Teeth 48 are preferably shaped with a smooth outer surface so that spring arm 50 is relatively easily pushed over each tooth 48 in one direction so that spring arm 50 may catch between adjacent teeth. The size of each tooth 48 is selected so that indexing wheel 24 rotates a fixed amount for each movement of a single tooth 48. In an alternate embodiment, shown in FIG. 1B, spring arm 50 may be eliminated, and an end 39 of rod 38 may be configured to engage with teeth 48. In this embodiment, as rod 38 is translated downward by diaphragm 40, end 39 is pushed over a first tooth to engage with the next tooth. End 39 is locked into position on top of the first tooth, so that as rod 38 is translated in the opposite direction, indexing mechanism 46 is pushed by rod 38 to move indexing wheel 24.

When $P_{18}$ is less than the force K exerted by spring 42, K pushes diaphragm 40 toward wheel 24. Rod 38 is lowered and, in turn, spring arm 50 is pushed by rod 38 away from chamber 41. Since the free end of spring arm 50 is caught between adjacent teeth 48, this motion turns wheel 24. When $P_{18}$ is greater than the force K exerted by spring 42, diaphragm 40 pulls rod 38 away from wheel 24 so that the free end of spring arm 50 is advanced over a tooth 48 and catches between another set of adjacent teeth in anticipation of the next need for a new infusion of gas. Chamber 41 is preferably open to the atmosphere so that the air contained in chamber 41 is not compressed when rod 38 and diaphragm 40 are pushed into chamber 41, as best shown in FIG. 1A. Alternatively, chamber 41 may be sealed and contain a liquefied natural gas such as butane to provide a reference pressure for chamber 41. The liquefied natural gas can replace spring 42 or apply an additional force in addition to spring 42.

The pressure cycle that triggers the ratcheting system controlling the motion of indexing wheel 24 is summarized in Table 1 and is further described below.

TABLE 1

Pressure Cycle in Gas Generating Apparatus; Shut-off Valve 35 is Open

| Pressure and Force Relationships | Effect on Ratchet System | Effect on Fuel Cell Valve 34 | Transfer of Gas From Fuel storage chamber 18 and Fuel Cell 14 |
|---|---|---|---|
| $P_{18} < K$ $P_{18} < P_T$ | Rod 38 is pushed away from chamber 41, thereby pushing spring arm 50 to turn wheel 24 and open next microsphere 26 | CLOSED | No flow |
| $P_{18} \leq K$ $P_{18} < P_T$ | No movement | CLOSED | No flow, gas pressure builds within fuel storage chamber 18 |
| $P_{18} \leq K$ $P_{18} \geq P_T$ | No movement | OPEN | Gas flows |
| $P_{18} > K$ $P_{18} > P_T$ | Rod 38 is lifted away from wheel 24 advancing spring arm 50 over the next tooth 48 | OPEN | Gas flows |
| $P_{18} > K$ $P_{18} < P_T$ | No movement | CLOSED | No flow |

Initially, the pressure in fuel storage chamber 18, $P_{18}$, can be sufficient to lift rod 38 away from spring arm 50. This may be accomplished by any method known in the art. For example, once system 10 is assembled, a predetermined amount of an initializing inert gas or hydrogen may be injected into fuel storage chamber 18 via, for example, a valve 34 or any other means. Preferably, the predetermined amount of the inert gas or hydrogen is sufficient to hold rod 38 away from spring arm 50 to keep spring arm 50 in its neutral state and, therefore, preventing indexing wheel 24 from turning. Also, preferably $P_{18}$ is higher than triggering pressure, $P_T$, to open check valve 34 to start the flow of gas to fuel cell 14 when optional shut-off valve 35 is opened. As the gas in fuel storage chamber 18 is transferred to fuel cell 14 through conduit 16, $P_{18}$ decreases.

Once $P_{18}$ decreases to a point that the force from spring 42 overcomes $P_{18}$, rod 38 is pushed by spring 42 so that it pushes on spring arm 50. As the free end of spring arm 50 is engaged with tooth 48, spring arm 50 carries/moves tooth 48 along with its motion, thereby turning indexing wheel 24. As indexing wheel 24 is turned, opening mechanism 28 opens microsphere 26 to release the stored fuel gas. As $P_{18}$ again builds within fuel storage chamber 18 due to the new gas production, $P_{18}$ increases until $P_{18}$ exceeds K, the force from spring 42, so that $P_{18}$, via diaphragm 40, overcomes the force of spring 42. Rod 38 consequently releases spring arm 50 so that spring arm 50 returns to its neutral state by slipping over the edge of another tooth 48 of structure 46 in preparation for the next turn of wheel 24.

$P_T$ and K are carefully selected so that the automatic operation of gas generating apparatus is not interrupted. Preferably, the force provided by spring 42 is very slightly less than $P_T$. In such a case, spring 42 will advance rod 38 to break another microsphere 26 just prior to the closing of valve 34.

Alternatively, indexing wheel 24 may be controlled electronically by a controller, such as, for example, a microprocessor connected to fuel cell 14 that controls a motor driving indexing wheel 24 (not shown). The controller in this alternative embodiment may monitor the pressure using sensors in fuel storage chamber 18. Exemplary pressure sensors include strain gauges and piezoelectric sensors. The pressure sensor may be any type of pressure sensor known in the art that is capable of being placed in fuel storage chamber 18 and measuring pressure in the anticipated range of approximately 0-40 psi, although this range may vary depending upon the fuel cell system and fuel used. For example, the pressure sensor may be a pressure transducer available from Honeywell, Inc. of Morristown, N.J. The pressure sensor may also be a glass or silica crystal that behaves like a strain gauge, i.e., the crystal emits a current depending upon the amount of pressure. Another example of an appropriate sensor for sensing the pressure within fuel storage chamber 18 is a piezoelectric sensor. Piezoelectric sensors are solid state elements that produce an electrical charge when exposed to pressure or to impacts. Suitable piezoelectric sensors are available from many sources, including PCB Piezotronics.

Figure 2:
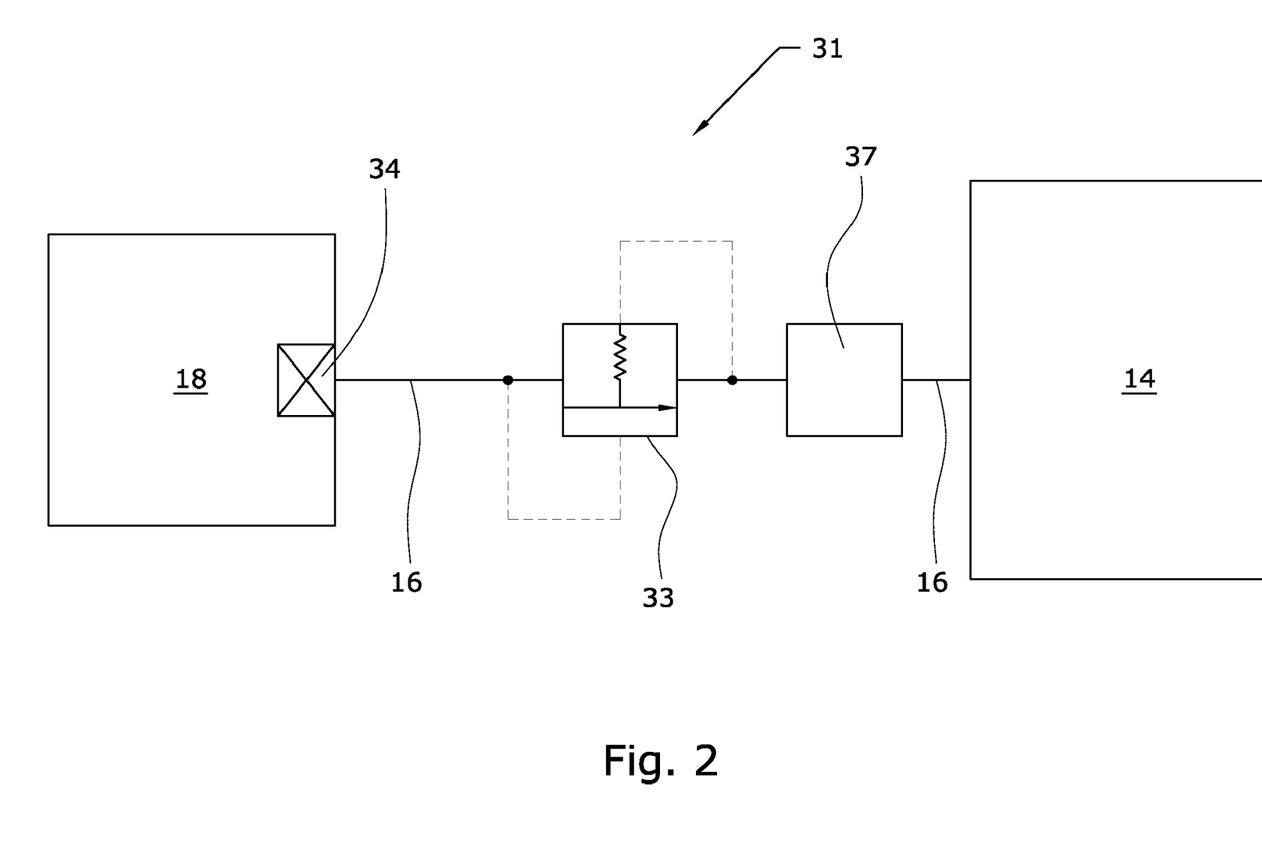
FIG. 2 is a schematic view of a fuel transfer system for use with any fuel supply according to the present invention.

Additionally, in order to control the flow characteristics, such as pressure and flow rate, of the fuel gas produced by any of the gas-generating apparatus discussed herein, a flow control system 31 as shown in FIG. 2 may be used to connect a fuel reservoir 18 to a fuel cell system 14. Flow control system 31 preferably includes a valve 34 to control the output of gas-generating apparatus 18, as described above with respect to, inter alia, FIGS. 1 and 1A. Fuel gas flows through valve 34 and into a fuel transfer conduit 16. Along the length of fuel transfer conduit 16 is a pressure regulator 33, which may be any type of pressure regulator known in the art. Preferably, given the potential variations in output pressure, pressure regulator 33 is a two-stage pressure regulator, where the first stage reduces the pressure a set amount, then the second stage optimizes the pressure. An appropriate pressure regulator is the PRD2 pressure regulator available from Beswick Engineering of Greenland, N.H. Additionally, in order to further control flow rate, an optional orifice 37 having a small diameter is positioned downstream of pressure regulator 33. A preferred diameter for orifice 37 is about 0.05 mm, although the size of orifice 37 depends on many factors including the type of fuel, the type of fuel cell, and the load driven by the fuel cell. The combination of pressure regulator and orifice 37 allows for a near constant flow rate of fuel into fuel cell 14.

Figure 3:
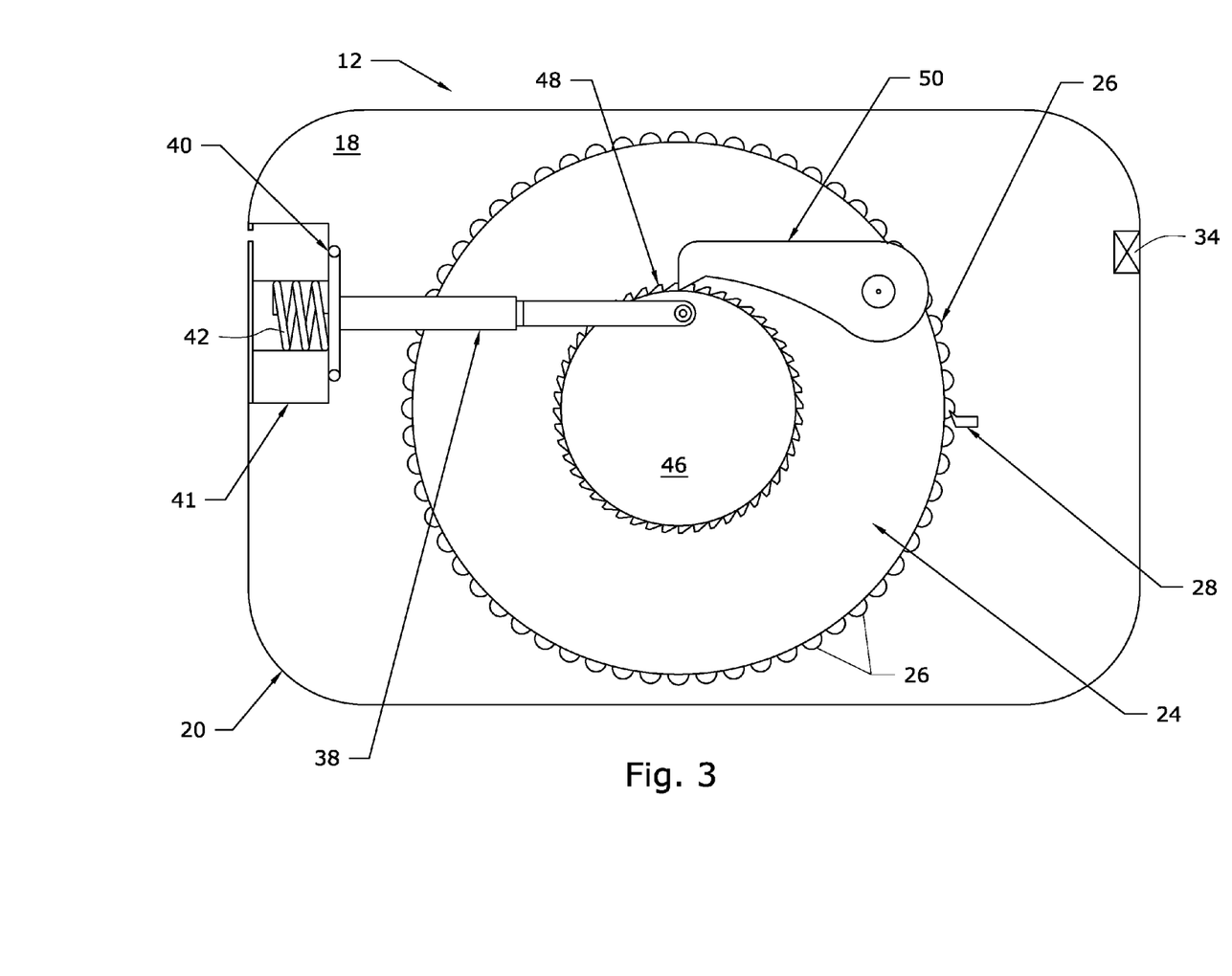
FIG. 3 is a schematic side view of an alternate embodiment of a fuel supply according to the present invention.

In another exemplary embodiment, as illustrated in FIG. 3, gas-generating apparatus 12 is generally similar to gas-generating apparatus 12 described with respect to FIGS. 1 and 1A, as gas generating apparatus 12 includes fuel storage chamber 18 with indexing wheel 24 suspended within fluid fuel component 22. Microspheres 26 containing a fuel component are disposed on the circumferential perimeter of indexing wheel 24. Opening mechanism 28 is configured to open microspheres 26 as indexing wheel 24 turns, and spring-driven, pressure-sensitive diaphragm 40 drives rod 38 to turn indexing wheel 24. In this embodiment, however, rod 38 is attached directly to ratcheting mechanism 46, so that as diaphragm 40 moves as described above with respect to FIGS. 1 and 1A, i.e., toward wheel 24 when $P_{18}$ is less than K, the spring force from spring 42, rod 38 pushes on ratcheting mechanism 46. A spring-loaded pawl 50, which is hingedly attached to wheel 24, engages with teeth 48 so that wheel 24 is locked into position with ratcheting mechanism 46 when rod 38 pushes on ratcheting mechanism 46. When $P_{18}$ is greater than K, rod 38 pulls on ratcheting mechanism 46. As ratcheting mechanism 46 is connected to wheel 24 only through pawl 50 and otherwise turns independently therefrom, wheel 24 does not turn as pawl 50 slips over teeth 48. Hence, ratcheting mechanism 48 is rotatable relative to indexing wheel 24.

Figure 4:
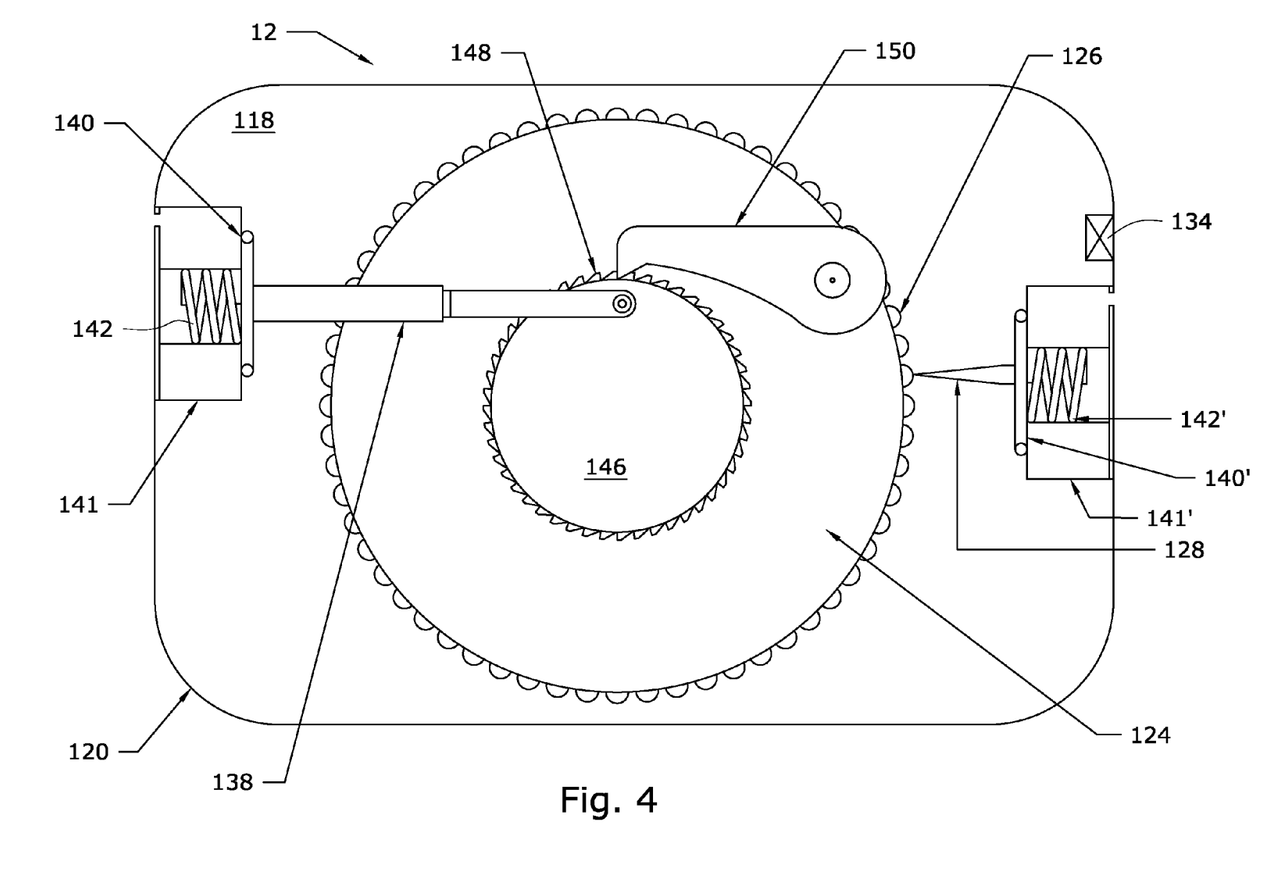
FIG. 4 is a schematic side view of another alternate embodiment of a fuel supply according to the present invention.

Referring to FIG. 4, another alternative gas-generating apparatus is shown. In this embodiment, an indexing wheel 124 having a plurality of sealed microspheres 126 disposed on an outer surface thereof is ratcheted using a spring mechanism 141 having a spring-loaded diaphragm 140 attached to a biasing spring 142 to drive a rod 138 which turns a ratcheting mechanism 146 as described above with respect to FIG. 3. Also, the same as the embodiment in FIG. 3, a spring-loaded pawl 150 which is hingedly attached to wheel 124 engages with teeth 148 on ratcheting mechanism 146 to allow wheel 124 to turn only in one direction.

However, in this embodiment, a second spring mechanism 141' is used to move an opening element 128 toward wheel 124 when a sealed microsphere 126 is positioned to be pierced. As with spring mechanism 141, second spring mechanism 141' has a pressure-sensitive diaphragm 140' exposed to $P_{18}$ and a biasing spring 142' to provide a spring force K' to oppose $P_{18}$. When $P_{18}$ is greater than K', opening element 128 is held away from wheel 124 and sealed microspheres 126 due to the force of $P_{18}$ pushing against diaphragm 140'. When K' is greater than $P_{18}$, opening element 128 is pushed towards wheel 124 and sealed microspheres 126 by spring 142'. Preferably, spring 142' is slightly weaker than spring 142 so that wheel 124 is turned before opening element 128 is pushed toward wheel 124.

Figure 5:
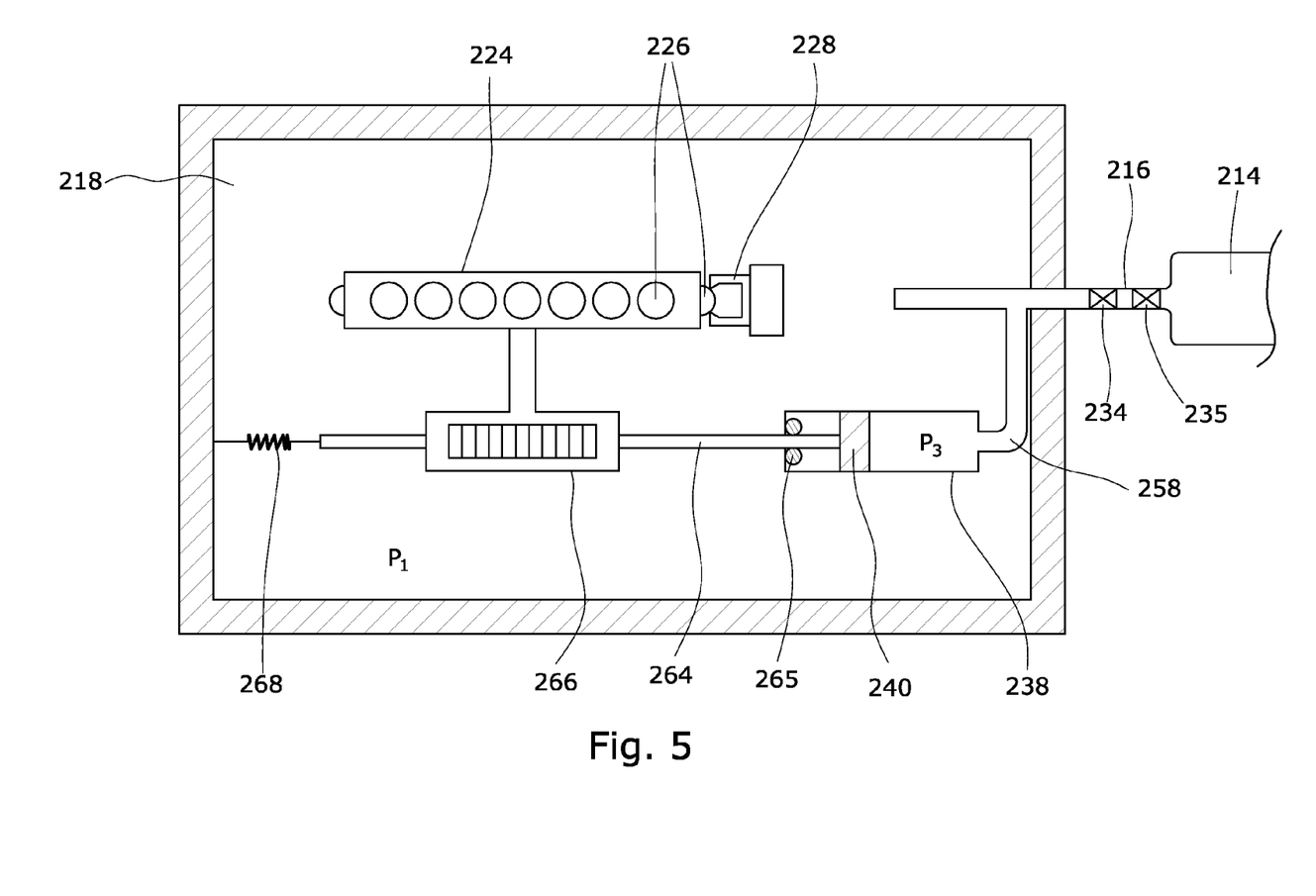
FIG. 5 is a top schematic view of an alternative embodiment of a fuel supply according to the present invention having an alternative ratcheting mechanism.

Referring to FIG. 5, another alternative gas-generating apparatus 212 is shown. Similar to the embodiments described above with respect to FIGS. 1-4, a fuel storage chamber 218 includes an indexing wheel 224 suspended therewithin. Sealed microspheres 226 containing a fuel component are disposed on the circumferential perimeter of indexing wheel 224. A puncturing mechanism 228 is configured to open sealed microspheres 226 as indexing wheel 224 turns.

The indexing mechanism in this exemplary embodiment includes a piston 240 sealingly disposed within a piston chamber 238 connected to a fuel conduit 216 via a pressure transfer tube 258. Thus, piston chamber 238 is exposed to the gas pressure in fuel storage chamber 218 via fuel conduit 216 and pressure transfer tube 258. A shaft 264 is fixedly attached at one end to piston 240 and extends out of an open end of piston chamber 238. Shaft 264 is configured with slots, teeth or similar structures along the length thereof. These slots engage with ratchet wheel 266.

Ratchet wheel 266 is attached to indexing wheel 224 so that ratchet wheel 266 is locked with indexing wheel 224 when turned in one direction, e.g., counter-clockwise, but rotates freely with respect to indexing wheel 224 when turned in the opposite direction, e.g., clockwise. The other end of shaft 264 is connected to a biasing spring 268 which biases shaft 264 toward pressure transfer tube 258. Spring 268 may be any spring known in the art, such as a helical spring, with a sufficient spring constant to drive shaft 264. Preferably, the turning ratio of ratchet wheel 266 and indexing wheel 224 is the same; however, ratchet wheel 266 and indexing wheel 224 may also have different turning ratios.

Preferably, fuel storage chamber 218 is initially pressurized so that the pressure therewithin, $P_{18}$, is higher than a triggering pressure, $P_T$, to cause check valve 234 to open. As piston chamber 238 is fluidly connected to fuel storage chamber 218, $P_{238}$, the pressure within piston chamber 238, is equal to $P_{18}$. $P_{238}$ pushes on piston 240, and the force provided by $P_{238}$ and the force from biasing spring 268, $K_{268}$, balance at this point. When the forces on piston 240 balance, ratchet wheel 266 is not turning.

As gas in fuel storage chamber 218 is transferred to a fuel cell 214 through a fuel conduit 216, $P_{18}$ decreases. With the decrease in $P_{18}$ comes a similar decrease in $P_{238}$. Once $P_{238}$ is reduced to the point that it no longer balances $K_{268}$, spring 268 overcomes $P_{238}$ causing piston 240 and shaft 264 to slide axially within piston chamber 238 towards transfer tube 258, which causes ratchet wheel 266 to turn. As ratchet wheel 266 is locked with respect to indexing wheel 224 when turned in this direction, indexing wheel 224 also turns. Preferably, a seal 265, such as an O-ring, gasket, jelly, or similar seal, is positioned where shaft 264 exits piston chamber 238 to prevent piston chamber 238 from leaking.

Similar to the embodiments discussed above, as indexing wheel 224 turns, opening mechanism 228 opens at least one sealed microsphere 226, thereby releasing the fuel gas stored therewithin into fuel storage chamber 218.

The produced gas in fuel storage chamber 218 increases to or above $P_{18}$. A portion of this produced gas is transferred through pressure transfer tube 258 into piston chamber 238. As such, $P_{238}$ is also increased and presses on piston 240. Once $P_{238}$ is exceeds $K_{268}$, piston 240 and shaft 264 slide within piston chamber 260 towards biasing spring 268, which compresses. As stated above, ratchet wheel 266 moves freely when piston 240 and shaft 264 are moving towards biasing spring 268. Thus, although piston 240 and shaft 264 move ratchet wheel 266 and biasing spring 268, the movement of ratchet wheel 266 does not turn indexing wheel 224. When $P_{18}$ exceeds $P_T$, the pressure to open check valve 234, gas begins to flow out of fuel storage chamber 218 and through optional shut-off valve 235 and into fuel cell 214.

$P_{18}$ and $P_{238}$ are again reduced due to the outflow of gas to fuel cell 214. When $P_{238}$ no longer exceeds $K_{268}$, biasing spring 268 slides shaft 264 and piston 240 axially within piston chamber 238 toward transfer tube 258. This movement causes ratchet wheel 266 and indexing wheel 224 to move in concert as described above to introduce more solid fuel component into fluid fuel component 222. This cycle is summarized below in Table 3.

TABLE 3

Pressure Cycle for Ratchet Wheel; Shut-Off Valve 235 is Open

| Pressure and Force Relationships | Effect on Ratchet System | Effect on Fuel Cell Valve 234 | Transfer of Gas From Fuel storage chamber 218 and Fuel Cell 214 |
|---|---|---|---|
| $P_{18} = P_{238}$<br>$P_{238} = K_{268}$<br>$P_{18} > P_T$ | Piston 240 is balanced by spring 268 and $P_3$, no movement | OPEN | Gas flows |
| $P_{18} = P_{238}$<br>$P_{238} < K_{268}$<br>$P_{18} < P_T$ | Piston 240 slides to turn ratchet wheel 266 and indexing wheel 224 | CLOSED | No flow |
| $P_{18} = P_{238}$<br>$P_{238} < K_{268}$<br>$P_{18} < P_T$ | No movement | CLOSED | No flow, gas pressure builds within fuel storage chamber 18 |
| $P_{18} = P_{238}$<br>$P_{238} > K_{268}$<br>$P_{18} < P_T$ | Piston 240 starts to move to reset wheel 224 | CLOSED | No flow |

Figure 6:
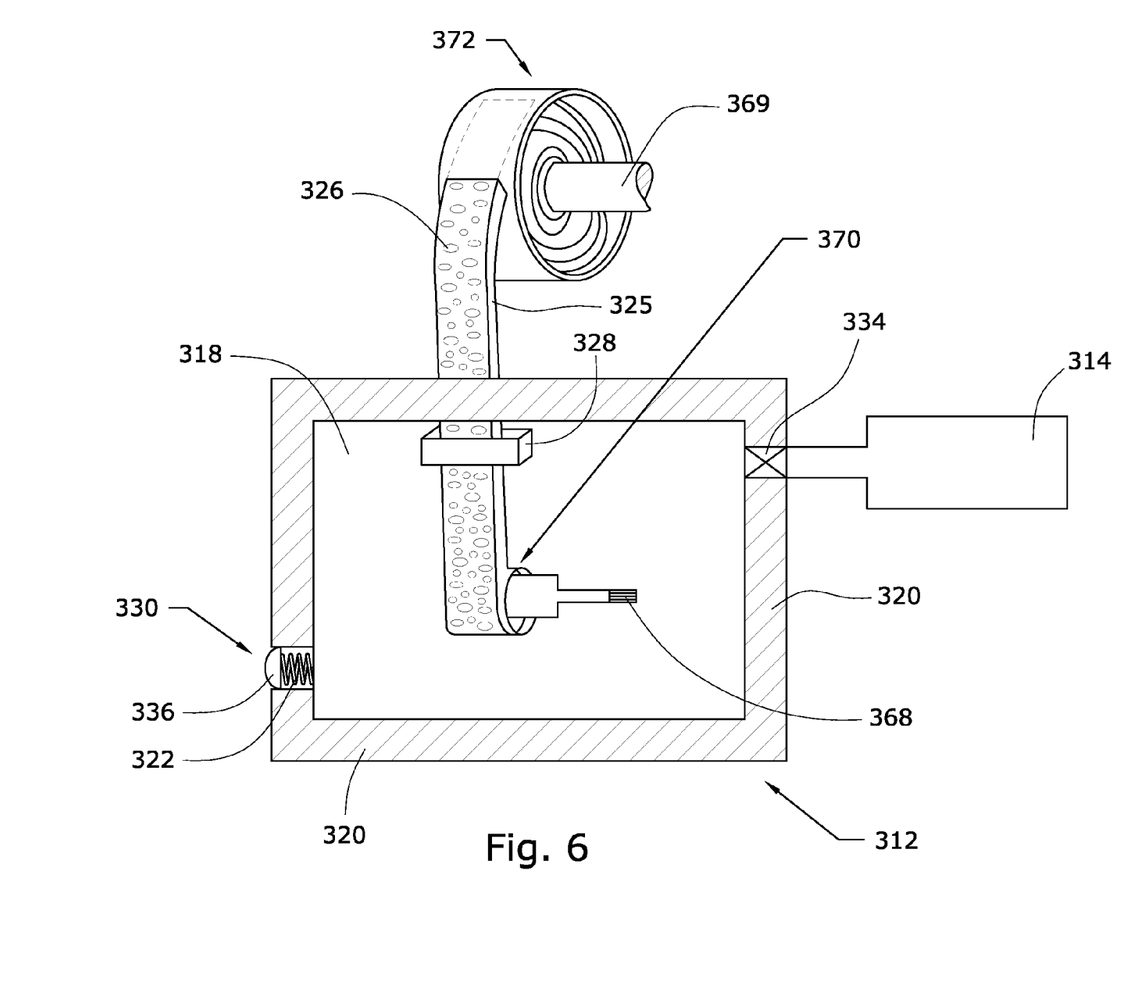
FIG. 6 is a schematic side view of another alternative embodiment of a fuel supply according to the present invention.

Referring to FIG. 6, yet another embodiment of a gas-introducing apparatus 312 according to the present invention is shown. As in FIGS. 1-5, gas-introducing apparatus 312 generally includes a chamber 318 defined by sidewalls 320. Chamber 318 includes a take-up wheel 370 and a feeding wheel 372, at least one of which is indexed. Preferably, take-up wheel 370 is indexed and feeding wheel 372 is not indexed. Disposed between take-up wheel 370 and feeding wheel 372 is an opening mechanism 328 that is capable of allowing the hydrogen to escape from microspheres 326, which are located on or within tape 325. As in the embodiments discussed above, opening mechanism 328 is a pinching or hammering mechanism or a light beam capable of fracturing microspheres 326 or a heating element capable of allowing the hydrogen gas to escape from microspheres 326.

As described above, preferably, tape 325 includes a plurality of hydrogen-containing microspheres 326 thereupon. Each of microspheres 326 contains a predetermined amount of hydrogen gas. Preferably, feeding wheel 372 is mounted on an axle 369 in such a manner that feeding wheel 372 may spin easily. In other words, feeding wheel 372 is preferably free of any gears or other mechanism to advance or stop its movement. In one exemplary embodiment, take-up wheel 370 may include an indexing gear 368 such as any of those described above with respect to FIGS. 1-5.

Tape 325 extends from feeding wheel 372 to take-up wheel 370. Preferably, take-up wheel 370 is an indexing wheel similar to indexing wheel 24 as described above with respect to FIG. 1, where take-up wheel 370 is preferably ratcheted so that it may turn only in one direction. Take-up wheel 370 is preferably driven by an indexing mechanism similar to those described above, so that take-up wheel 370 pulls tape 325 off of feeding wheel 372, through or over mechanism 328, which allows the hydrogen gas inside microspheres 326 to escape by fracturing microspheres 326 or heating microspheres 326. Take-up wheel 370 then winds the spent tape 325 around itself. Any known indexing methods may be used to drive take-up wheel 370. Preferably, any one of the spring-driven mechanisms described above for driving an indexing wheel may be used. The pressure cycles to automatically drive these indexing mechanisms are as described in the embodiments above.

In an alternative embodiment, both take-up wheel 370 and feeding wheel 372 are indexing wheels that use the same or different driving mechanism, such as one or more of the mechanisms described above. Furthermore, in another example, feeding wheel 372 is an indexing wheel that, when turned by one or more of the mechanisms described above, pushes a predetermined portion of tape 325 through or over the mechanism 328 to allow the gas inside microspheres 326 to escape. In this exemplary embodiment, take-up wheel 370 is preferably geared to wind the spent portions of tape 325.

Additionally, similar to any of the embodiments described above, this exemplary embodiment may also include a pressure reduction valve 330 having a biasing spring 322 and cap/plug 336 to prevent over-pressurization of fuel storage chamber 318.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A gas-introducing apparatus comprising:
    a chamber;
    an indexing mechanism operatively connected to at least one gas-containing storage unit, wherein the indexing mechanism is pressure-driven; and
    a gas-releasing mechanism capable of releasing the gas from the storage unit to release a predetermined amount of the gas into the chamber.

2. The gas-introducing apparatus of claim 1, wherein the gas-containing storage unit comprises at least one microbubble, microsphere, bead, or a combination thereof.

3. The gas-introducing apparatus of claim 1, wherein the gas-releasing mechanism comprises a pinching mechanism, a light source having a wavelength capable of fracturing the gas-containing storage unit, a heating unit, or a combination thereof.

4. The gas-introducing apparatus of claim 1, wherein the gas-containing storage unit is located on the indexing mechanism.

5. A gas-introducing apparatus comprising:
    a chamber;
    an indexing mechanism operatively connected to at least one gas-containing storage unit, wherein the gas-containing storage unit is located on the indexing mechanism; and
    a gas-releasing mechanism capable of releasing the gas from the storage unit to release a predetermined amount of the gas into the chamber, wherein the gas-releasing mechanism is configured to at least partially fracture the gas-containing storage unit to release the gas as the indexing mechanism is indexed.

6. The gas-introducing apparatus of claim 4, wherein the gas-releasing mechanism is configured to release the gas within the gas-containing storage unit as the indexing mechanism is indexed without fracturing the gas-containing storage unit.

7. The gas-introducing apparatus of claim 4, wherein the indexing mechanism comprises a ratcheted wheel.

8. A gas-introducing apparatus comprising:
    a chamber;
    an indexing mechanism operatively connected to at least one gas-containing storage unit, wherein the gas-containing storage unit is located on the indexing mechanism, and wherein the indexing mechanism comprises a ratcheted wheel, wherein the ratcheted wheel is turned by a pressure-driven pawl mechanism, wherein the pawl engages with at least one of a plurality of downwardly angled teeth fixedly attached to the ratcheted wheel; and
    a gas-releasing mechanism capable of releasing the gas from the storage unit to release a predetermined amount of the gas into the chamber.

9. The gas-introducing apparatus of claim 8, further comprising a pressure-driven rod, wherein the rod is attached to a spring-loaded diaphragm, and wherein a free end of the rod is connectable to a spring arm configured to engage with at least one of a plurality of teeth connected to the ratcheted wheel.

10. The gas-introducing apparatus of claim 9, wherein a free end of the rod is configured to engage with at least one of a plurality of teeth connected to the ratcheted wheel.

11. The gas-introducing apparatus of claim 7, further comprising a drive mechanism comprising a pressure-driven geared rod engaged with a correlating gear connected to the ratcheted wheel.

12. The gas-introducing apparatus of claim 11, wherein a piston end of the geared rod comprises a piston sealingly disposed within a piston chamber fluidly connected to the chamber, and wherein a second end of the geared rod is attached to a sidewall of the gas-introducing apparatus by a spring that biases the rod away from the sidewall.

13. The gas-introducing apparatus of claim 1 further comprising a first wheel and a second wheel, wherein at least one of the wheels includes the indexing mechanism, and wherein either the first wheel or the second wheel comprises a feeding wheel comprising a tape having a plurality of gas-containing storage units containing hydrogen that are disposed on an exterior surface of the feeding wheel, and wherein the other wheel comprises a take-up wheel, wherein the tape extends from the feeding wheel to the take-up wheel so that the take-up wheel can pull the tape over or through the gas-releasing mechanism.

14. The gas-introducing apparatus of claim 13, wherein an exterior surface of the first wheel includes a plurality of gas-containing storage units and wherein an exterior surface of the second wheel includes a plurality of gas-releasing mechanisms.

15. The gas-introducing apparatus of claim 14, wherein the first wheel and the second wheel are designed such that each of the plurality of gas-releasing mechanisms corresponds to at least one of the gas-containing storage units.

16. The gas-introducing apparatus of claim 13, wherein both wheels are turned by a pressure-driven mechanism.

* * * * *